United States Patent

Miedema

[11] 4,016,497
[45] Apr. 5, 1977

[54] FEEDBACKWARD DISTORTION COMPENSATING CIRCUIT

[75] Inventor: Hotze Miedema, Boxford, Mass.

[73] Assignee: Bell Telephone Laboratories, Incorporated, Murray Hill, N.J.

[22] Filed: May 5, 1976

[21] Appl. No.: 683,320

[52] U.S. Cl. .............................. 328/162; 328/155; 325/65; 330/149
[51] Int. Cl.² .......................................... H04B 1/62
[58] Field of Search .......... 328/162, 163, 167, 155, 328/168; 325/65; 333/28 R; 330/149

[56] References Cited
UNITED STATES PATENTS

| | | | |
|---|---|---|---|
| 3,231,819 | 1/1966 | Aaron | 325/65 |
| 3,383,618 | 5/1968 | Engelbrecht | 330/149 |
| 3,566,285 | 2/1971 | Schroeder | 328/162 X |
| 3,701,028 | 10/1972 | Markevich | 328/162 X |
| 3,810,018 | 5/1974 | Stover | 325/65 X |
| 3,825,843 | 7/1974 | Felsberg et al. | 328/163 |

*Primary Examiner*—John S. Heyman
*Attorney, Agent, or Firm*—Bryan W. Sheffield

[57] ABSTRACT

A feedbackward, distortion-compensating circuit suitable for pre- and post-distortion compensation of non-linear amplifying devices. The circuit taps-off a portion of the output signal of the compensating circuit, cubes it, and combines it with the input signal to that circuit. Appropriate adjustments to the phase and amplitude of the cubed signal ensure that the output signal of the non-linear amplifying device is free from all significant distortion.

6 Claims, 4 Drawing Figures

FEEDBACKWARD DISTORTION COMPENSATING CIRCUIT

BACKGROUND OF THE INVENTION

1. Field of the Invention

Broadly speaking, this invention relates to signal transmission systems. More particularly, in a preferred embodiment, this invention relates to signal transmission systems in which the distortion produced by non-linearities in the operation of an active device is substantially eliminated through the introduction of a compensating, distortion-cancelling signal.

2. Discussion of the Prior Art

Pre-distortion and post-distortion techniques for cancelling the distortion introduced by the non-linear transfer characteristics of active devices, such as amplifiers, are well known. In a typical prior art arrangement, as disclosed in U.S. Pat. No. 3,383,618 issued on May 14, 1968 to R. S. Engelbrecht, a "non-linear" device in a compensation circuit is driven by a portion of the output signal of an amplifier. The non-linear device generates a composite signal containing a host of distortion components covering a range of multiple orders of distortion. All of these distortion components pass through two controllers, one for phase and the other for amplitude, before they are coupled with the output signal of the amplifier to provide a reduction in overall signal distortion through complementary cancellation. In the above and other known arrangements, it has been necessary to adjust the phase and amplitude of all of the distortion components as a single composite signal to eliminate the third order distortion and thereby obtain an overall reduction in signal distortion.

Whenever the signal bandwidth is small compared to the center frequency, third order distortion is likely to be the largest and most troublesome of the distortion components generated by the non-linear operation of an active device. In that case the even orders of non-linear distortion fall outside the signal band while higher, odd orders of distortion, that is, orders greater than the third, which are present in the output signal of an uncompensated bandpass amplifier, for example, are usually small. The higher, odd order distortion components present in the output of the non-linear device which is used to compensate the amplifier have a different phase and amplitude than the corresponding higher orders of distortion in the output of the amplifier. These differences are due to unavoidable minute deviations between the characteristics of the compensating non-linear device and the amplifier. Therefore, when these two outputs are combined, the third order distortion may be reduced, but the higher orders of distortion are typically magnified. This disadvantageous compromise renders many prior art distortion compensation techniques ineffective for numerous applications. Such compensation techniques are particularly inadequate for use in analogue transmission systems which employ, in tandem, numerous repeater amplifiers in the transmission path.

To overcome the above problem, the distortion compensating circuit disclosed in commonly-assigned U.S. Pat. No. 3,825,843, which issued on July 23, 1974 to R. I. Felsberg and H. Miedema, was developed. In this circuit, which has proved highly successful in practice, third order distortion in a signal path is substantially eliminated without a detrimental increase in higher orders of distortion. A portion of the signal in the signal path is extracted and applied to a squarer and a multiplier which together comprise a compensation circuit. The squarer operates on its input signal to produce a second order output signal. In the multiplier, the second order output signal and the other input signal thereto are multiplied together to produce a third order output signal. The phase and amplitude of the third order signal are adjusted to provide a compensating signal. This compensating signal is then coupled to the signal path so that the third order distortion produced in the signal path is substantially eliminated through complementary cancellation.

Although the circuit disclosed in the above-referenced U.S. Pat. No. 3,825,843 is highly successful in eliminating third order distortion, the interaction between this circuit and the non-linear circuit it is expected to linearize introduces higher orders of distortion not originally present in the output signal. This higher order distortion components are, however, relatively low in amplitude when the output level is well below saturation and do not pose a problem in most applications. However, the level of these higher order components increases rapidly with increasing signal levels. It is therefore to be expected that the trend to even higher output levels will reach the point where these higher-order distortion components may no longer safely be ignored.

SUMMARY OF THE INVENTION

As a solution to this, and other problems, I have discovered that if the distortion compensating circuit shown in U.S. Pat. No. 3,825,843 is modified such that it operates in the feedbackward mode rather than the feedforward mode a most surprising effect occurs, namely, the third order distortion terms are eliminated, as before, but with no additional higher-order distortion terms being generated.

More specifically, a preferred embodiment of the invention comprises a distortion compensating circuit for a signal path subject to distortion. The compensating circuit comprises means, connected to the output of the compensating circuit, for extracting a portion of the signal in the signal path and means, operating on the extracted signal portion, for producing a third order output signal therefrom.

The distortion compensating circuit further comprises means for adjustably controlling the phase and amplitude of the third order output signal to provide a compensating signal having an opposing phase relationship with and an amplitude substantially equal to the third order distortion effects present in the signal path, and means, connected to the input of the compensating circuit, for coupling the compensating signal to the signal path to substantially eliminate the third order distortion effects from the signal path.

The invention and its mode of operation will be more fully understood from the following detailed description when taken with the appended drawings, in which:

DETAILED DESCRIPTION OF THE INVENTION

Figure 1:
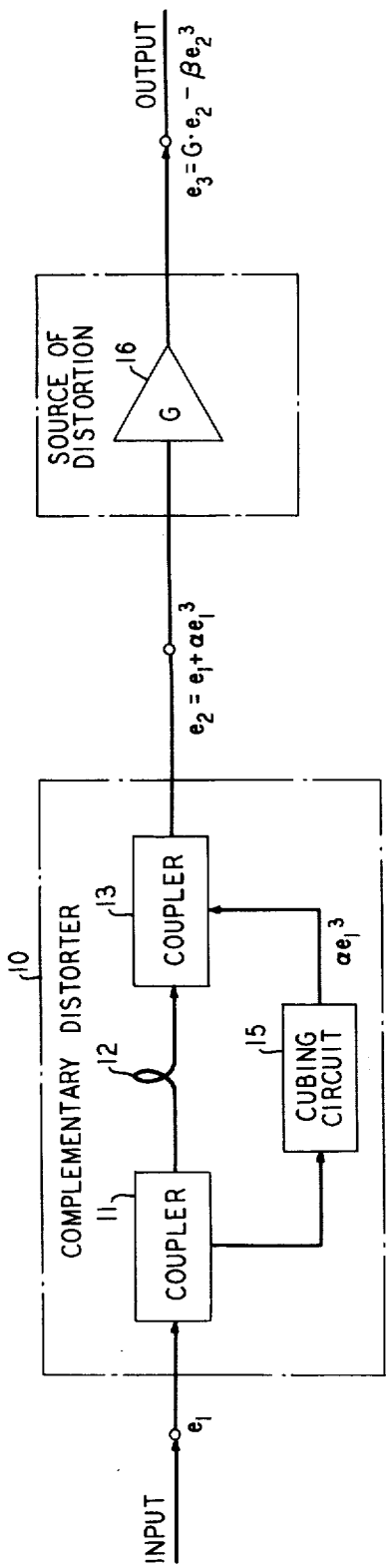
FIG. 1 is a block schematic diagram of a typical prior art distortion compensating circuit operating in the feedforward mode.

FIG. 1 depicts a typical prior art distortion compensating circuit, for example the circuit shown in U.S. Pat. No. 3,825,843. As shown, distorter 10 comprises a first signal coupler 11, a delay line 12, a second signal coupler 13, and a cubing circuit 15 interconnected between signal couplers 11 and 13. The output of distorter 10 is connected to the input of an amplifier 16, having a linear gain G, which amplifier is known to generate undesired distortion components.

As explained more fully in U.S. Pat. No. 3,825,843 which is hereby incorporated by reference, signal coupler 11 taps-off a small fraction of the input signal, $e_1$, applied to the distorter 10. This fractional signal is then cubed in cubing circuit 15 and, as the signal $\alpha e_1^3$, added in coupler 13 to the delayed signal $e_1$ for subsequent amplification in non-linear amplifier 16.

The input to amplifier 16, $e_2$, is given by the equation:

$$e_2 = e_1 + \alpha e_1^3. \tag{1}$$

Thus, the output of the amplifier 16, $e_3$, is given by the equation:

$$e_3 = Ge_2 - \beta e_2^3 \tag{2}$$

$$= G(e_1 + \alpha e_1^3) - \beta(e_1 + \alpha e_1^3)^3 \tag{3}$$

$$= Ge_1 + e_1^3(\alpha G - \beta) - e_1^5 \cdot 3\alpha\beta - e_1^7 \cdot 3\alpha^2\beta - e_1^9 \alpha^3\beta \tag{4}$$

Now, if the parameters of the circuit are adjusted such that $\alpha G = \beta$, then equation 4 becomes:

$$e_3 = Ge_1 - e_1^5 \cdot 3\alpha\beta - e_1^7 \cdot 3\alpha^2\beta - e_1^9 \alpha^3\beta \tag{5}$$

In other words, third-order distortion has been eliminated from the output of amplifier 16 at the expense of the appearance of some fifth, seventh and ninth-order distortion terms which would not otherwise have been present in the output signal. Under normal operating conditions, these newly introduced, higher-order terms are small because both $\alpha$ and $\beta$ are small. However, under certain circumstances they may be troublesome.

A similar situation occurs of the complementary distorter is used following the source of distortion. Here, too, the third-order distortion can be eliminated at the expense of introducing low levels of higher order distortion.

According to the invention, it has been discovered that third-order distortion may be eliminated without introducing additional higher-order terms, by operating the cubing circuit shown in FIG. 1 in a feedback mode, rather than the feedforward mode. This modification completely overcomes the difficulties experienced, under certain circumstances, with the prior art arrangement.

Figure 2:
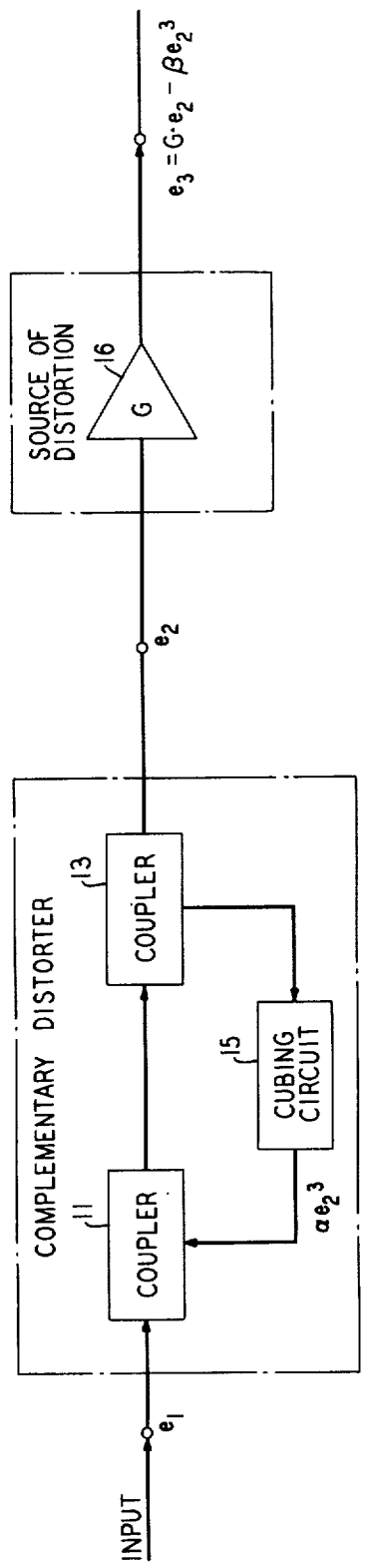
FIG. 2 is a block schematic diagram of the modified distortion compensating circuit according to the invention which operates in the feedbackward mode.

As shown in FIG. 2, in the improved arrangement the cubing circuit is connected in such a manner that it receives at its input a small fraction of the signal appearing at coupler 13. The output of cubing circuit 15 is then fed into coupler 11 for addition to the incoming input signal $e_1$. The output of the complementary distorter, $e_2$, is given by the equation:

$$e_2 = e_1 + \alpha e_2^3 \tag{6}$$

or, by rearranging the terms, $$e_1 = e_2 - \alpha e_2^3. \tag{7}$$

The output of amplifier 16, $e_3$, will then be given by the equation:

$$e_3 = Ge_2 - \beta e_2^3$$

$$= G(e_2 - (\beta/G) e_2^3) \tag{8}$$

Thus, if the circuit parameters are again adjusted such that $\alpha G = \beta$, that is to say, $\alpha = \beta/G$, then $$e_3 = Ge_1 \tag{9}$$

and the output signal is free from all distortion products.

Figure 3:
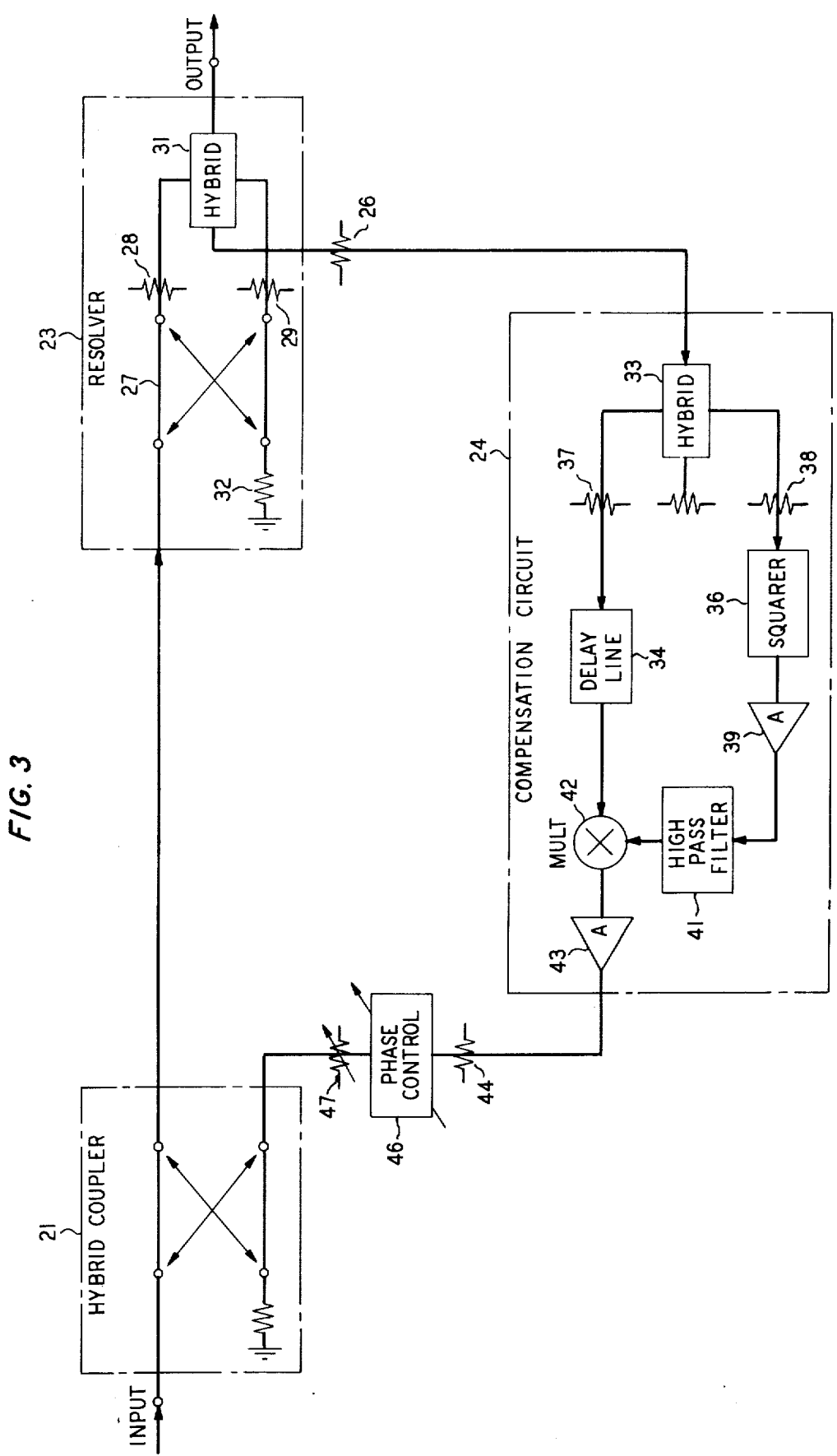
FIG. 3 is a block schematic diagram of an illustrative compensating circuit, shown in FIG. 2, with considerably more detail shown.

FIG. 3 is a block schematic diagram which depicts the circuitry shown in FIG. 2 in greater detail. As shown, the input signal is applied to a hybrid coupler 21, thence, to the input of a signal coupler 23.

Most of the signal applied to signal coupler 23 appears at the output, while a small portion is coupled to a compensation circuit 24 through an attenuator 26.

Signal coupler 23 comprises a device known to those in the art as a resolver. A resolver provides two output signals which differ in phase from each other and this phase difference remains constant over a given frequency band. For the purposes of this invention, this frequency band should be at least coextensive with the bandwidth of the signal being transmitted. The resolver in coupler 23 comprises a quadrature hybrid 27 connected through attenuators 28 and 29 to a 180° hybrid-junction power splitter 31. As is known to those skilled in the art, the value of attenuators 28 and 29 determines the value of the constant phase difference that will be maintained between the signals applied to the output and to compensation circuit 24. The remaining port of quadrature hybrid 31 is connected to an impedance termination 32.

Compensation circuit 24 comprises a hybrid-junction splitter 33 which delivers an output signal to a delay line 34 and another output signal to a squarer 36 through respective attenuators 37 and 38. The two output signals of splitter 33 are in phase with each other. Squarer 36 may be realized as a balanced frequency doubler which provides a squared or second order, output signal from its input signal. The second order output signal passes through an amplifier 39 and a high-pass filter 41 and is then applied to a multiplier 42. Multiplier 42 takes this second order output signal and multiplies it with the other input signal to multiplier 42, derived from delay line 34, to provide a third order output signal. The third order signal is then amplified by an amplifier 43 and applied to an attenuator 44.

The filter 41 serves to pass the band of second order harmonic frequencies and to block the baseband components. The delay line 34 may comprise a short length of coaxial cable. The delay of delay lines 34 should be equal to the delay encountered by a signal in the path comprising squarer 36. Of course, a cubing circuit which produces a third order signal directly may be substituted for squarer 36 and multiplier 42, if desired.

The phase and amplitude of the third order signal obtained from attenuator 44 are adjusted by a variable phase shifter or phase control 46 and a variable attenuator 47. Alternatively, this phase control may be accomplished by adjustment of resolver 23. The adjusted third order signal and the input signal are then combined by hybrid coupler 21 to produce the input signal to resolver 23. In the case of pre-distortion compensation, the output from resolver 23 signal is pre-distorted for application to the input of the active device sought to be compensated. After the signal passes through the active device, the output therefrom will be free of third order non-linear distortion effects as explained with reference to FIG. 2. Alternatively, the invention can provide post-distortion compensation. In this case, the input transmission signal to coupler 21 contains distortion. This distortion is then compensated and the output signal of coupler 23 is virtually free of third order distortion.

In operation, the input signal is applied to coupler 21 and passes to resolver 23. Resolver 23 extracts a portion of the transmission signal and applies it to compensation circuit 24. Compensation circuit 24 performs its multiplying function to produce a third order signal. This third order signal then has its amplitude and phase adjusted before being coupled with the transmission signal in hybrid coupler 21. Attenuator 47 is adjusted so that the amplitude of the compensating signal measured at the output of the combination pre-distorter and active device is of the same level as the distortion introduced by the active device, which may be connected to either the input or output of FIG. 3. The attenuators 28 and 29 of resolver 23 are chosen to provide a given initial phase difference between its two output paths. The phase control 46 then permits a precise phase adjustment so as to achieve an exact opposing phase relationship between the compensating signal and the third order distortion of the active device.

Figure 4:
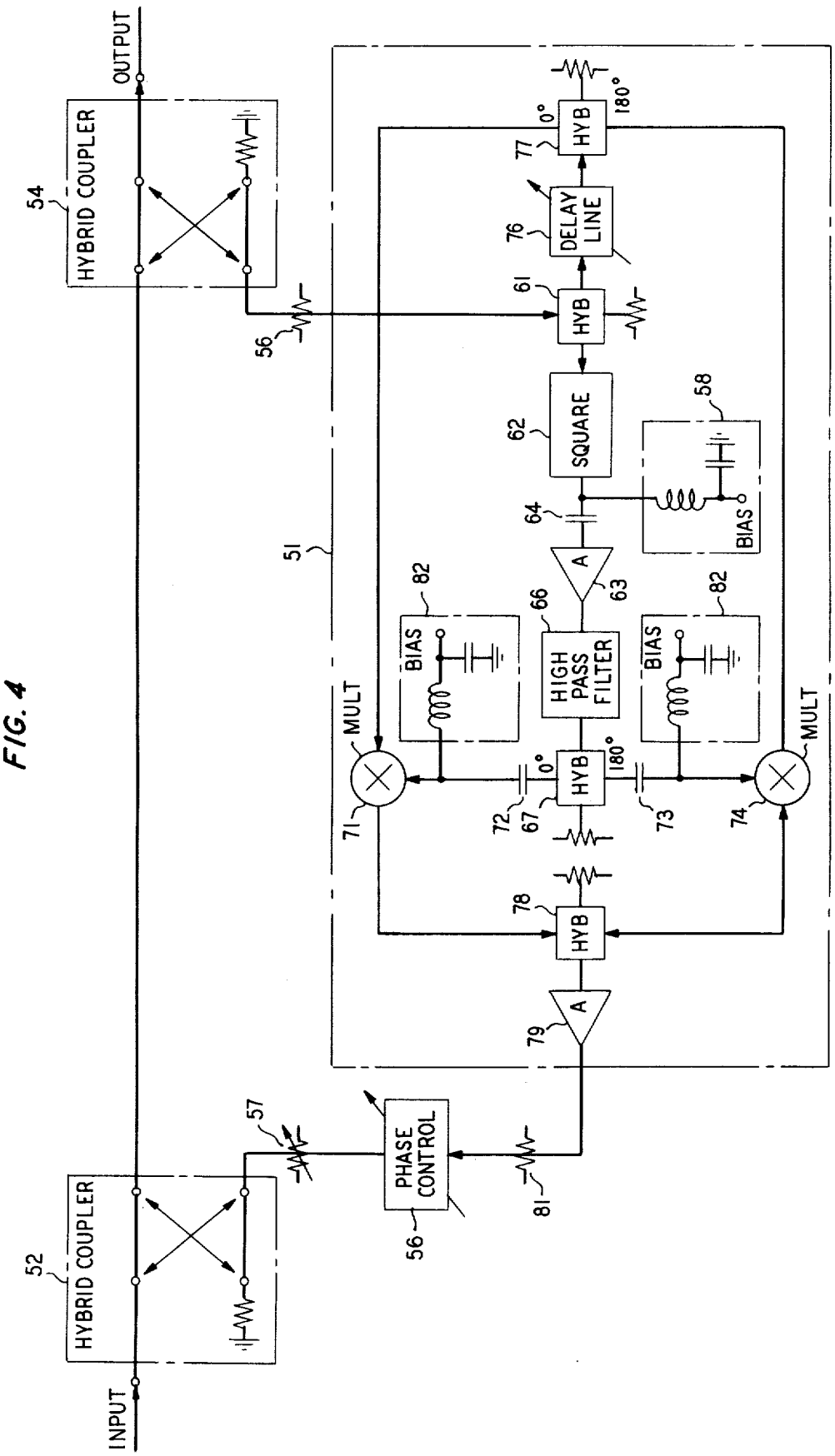
FIG. 4 is a block schematic diagram of another illustrative compensating circuit as shown in FIG. 2.

FIG. 4 is another embodiment of the present invention wherein a pair of multipliers is connected in a balanced configuration in a compensation circuit 51. The input signal is applied to a quadrature hybrid 52 thence to a hybrid coupler 54. Coupler 54 delivers most of the transmission signal to its output and the remaining portion of the transmission signal, via an attenuator 56, to compensation circuit 51. The two output signals of hybrid 54 have a phase difference of 90°. It should be understood, however, that in certain applications, particularly those involving wideband transmission signals, it may be desirable to replace hybrid 54 with a resolver. The latter makes it possible to maintain the required opposing phase difference between its output signals over a wider frequency range than quadrature hybrid 54. The compensation circuit 51, which will be considered in detail hereinafter, generates a third order distortion signal. This third order signal then has its phase and amplitude adjusted by a variable phase shifter 56 and a variable attenuator 57, respectively. These two adjustments yield the proper phase and amplitude for the third order output signal relative to the third order distortion introduced by the active device. The adjusted third order signal and the incoming signal are then combined by hybrid 52 to produce, for example, a predistorted transmission signal. The predistorted transmission signal thus effectively compensates for the distortion introduced by the active device through complementary cancellation.

Similar to the circuit of FIG. 3, the circuit of FIG. 4 is equally adapted to provide either pre-distortion or post-distortion compensation; that is, it may be connected to the input or output of the active device being compensated.

In compensation circuit 51, the transmission signal is applied to a hybrid 61 which divides the signal into two equal components that are in-phase with each other. The first signal component is applied to a squarer 62, which produces a second order signal. This second order signal is then applied to amplifier 63, via a dc blocking capacitor 64. The second order output signal passes through a highpass filter 66 to another hybrid 67. The highpass filter 66 passes the band of second harmonic frequencies of the input signal and attenuates, or stops, the baseband signal. Hybrid 67 divides the second order signal into two equal components that have a phase difference of 180°. One second order component is applied to a multiplier 71 via a capacitor 72, while the other component is applied through a capacitor 73 to a multiplier 74. Both capacitors serve as dc blocking capacitors.

From the other output port of hybrid 61, the other transmission signal component is applied to a variable delay line 76, which supplies the input signal to hybrid 77. Hybrid 77 divides this signal into two equal components each 180° out-of-phase with the other. The first component is applied to multiplier 71, while the second is applied to multiplier 74. Both multipliers serve to produce third order output signals. The function of variable delay 76 is to make the delay in applying the transmission signal components to the two multipliers equal to the delay encountered in generating the second order signals that are applied to the two multipliers via hybrid 67.

It should be noted that the two input signals to multiplier 74 are 180° out-of-phase with the respective inputs to multiplier 71. The effect of this relative phase difference upon multiplier operation will now be considered. Multiplier 74 produces an output signal that is phase shifted an additional 180° so that its output, in effect, is shifted relatively a total of 360° [180° + 180° = 360° ≈ 0°] or back into phase with the output of multiplier 71. As a result, a hybrid 78 adds these two input signals in-phase to produce a single third order output; and perhaps, more importantly, any unwanted portion of the input signals to the multipliers which feed through to their outputs are 180° out-of-phase and therefore cancel each other out in hybrid 78. The third order output signal from hybrid 78 is applied to an amplifier 79 whose output is then supplied, via an attenuator 81, to variable phase control 56.

In addition to the difference in configuration between the compensation circuits of FIGS. 3 and 4, it should be noted that squarer 62 and multipliers 71 and 74 are biased through decoupling circuits 82. These components utilize Schottky barrier diodes which require bias to operate at low-signal levels. In addition, the bias must be chosen to set the zero signal operating point in the center of the square-law region of the Schottky barrier diode so that the device operates as a pure multiplier over the largest possible dynamic range of signal levels.

The balanced squaring and multiplying circuits shown in FIGS. 2 and 3 may be any circuit which is capable of performing the desired function, for example, the squaring and multiplying circuits respectively shown in FIGS. 4A and 4B of the above-referenced U.S. Pat. No. 3,825,843.

It may at times be desirable to control the amplitude and phase of the third order distortion compensating signal automatically; for example, in those applications where the active device being compensated introduces distortion that tends to change as the device ages. Once the change in the distortion of such an active device exceeds a prescribed level, the amplitude and phase can be controlled automatically by conventional feedback control means, to increase the effectiveness of the compensation and reduce the overall distortion to an insignificant level. In certain other instances, the distortion compensation techniques of the invention may be utilized to compensate for other given orders of distortion; e.g., second, fourth or fifth orders of distortion.

It is to be understood that the distortion compensation circuits disclosed in the foregoing are intended to merely represent illustrative embodiments of the principles of the invention. In other applications, for example, additional multipliers might be utilized in distortion compensation circuits to eliminate distortion higher than the third order. Also, in certain applications (carrier equipment) it may be desirable to eliminate second order distortion. This can be accomplished using only a squarer with suitable gain and phase control equipment. In other further applications, a plurality of orders of distortion may be individually compensated by a plurality of separately operated compensation circuits. Accordingly, it must be understood that various changes and modifications of the distortion compensation circuitry disclosed herein may occur to those skilled in the art without departing from the spirit and scope of the invention.

What is claimed is:

1. A distortion compensating circuit for a signal path subject to distortion comprising:
    means, connected to the output of said compensating circuit, for extracting a portion of the signal in said signal path;
    means, operating on said extracted signal portion, for producing a third order output signal therefrom;
    means for adjustably controlling the phase and amplitude of said third order output signal to provide a compensating signal having an opposing phase relationship with and an amplitude substantially equal to third order distortion effects present in said signal path; and
    means, connected to the input of said compensating circuit, for coupling the compensating signal to said signal path to substantially eliminate said third order distortion effects from said signal path.

2. The distortion compensating circuit, according to claim 1 wherein said third order signal producing means comprises:
    a squaring circuit for operating on a portion of the extracted signal thereby to produce a second order output signal;
    a multiplier circuit connected to receive said second order output signal and a portion of the extracted signal for multiplying the same thereby to produce a third order output signal.

3. The distortion compensating circuit according to claim 1 wherein the extracting means comprises a resolver for providing a determined phase shift between the signal in said signal path and the signal energy extracted therefrom, said phase shift being substantially constant over the frequency band and dynamic range of the signal in said signal path.

4. The distortion compensating circuit according to claim 1 further including means for eliminating feedthrough signal components from the compensation signal which is coupled back into said signal path.

5. The distortion compensating circuit according to claim 1 further comprising:
    first means for equally dividing the second order output signal into first and second components shifted 180° from each other;
    second means for equally dividing a portion of the extracted signal into first and second components shifted 180° from each other;
    a first multiplier connected to receive the first components from the first and second dividing means;
    a second multiplier connected to receive the second components from the first and second dividing means, said first and second multipliers providing third order output signals by multiplying their respective input signals together; and
    signal combining means for adding the third order output signals from said first and second multipliers in phase to produce a single third order output signal, said signal combining means serving to eliminate those unwanted portions of the multiplier input signals that feed through to the outputs of said first and second multipliers.

6. A distortion compensating circuit for a signal path subjecting a transmission signal to distortion comprising:
    means, connected to the output of said compensating circuit, for extracting a part of the transmission signal in said signal path thereby to supply first and second portions of the same;
    a squaring circuit for operating on said first portion of the extracted transmission signal to produce a second order output signal;
    a filter connected to receive said second order output signal, said filter passing the second order harmonic frequencies of said transmission signal while blocking the fundamental frequency components of said transmission signal;
    means for introducing a propagation delay into said second portion of the extracted transmission signal;
    a multiplier connected to receive the output of said filtering means and the delayed second portion of the extracted signal, said multiplier multiplying together the signals applied thereto, thereby to produce a third order output signal;
    means for adjustably controlling the phase and amplitude of said third order output signal to provide a compensating signal having an opposing phase relationship with and an amplitude substantially equal to the third order distortion effects introduced to said transmission signal by said signal path; and
    means, connected to the input of said compensating circuit, for coupling the compensating signal to said signal path to substantially eliminate said third order distortion effects introduced by said signal path to produce an output transmission signal virtually free of same.

* * * * *